(12) United States Patent
Shen et al.

(10) Patent No.: US 12,384,074 B1
(45) Date of Patent: Aug. 12, 2025

(54) TOOLING MOLD FOR BRAKE DISC MANUFACTURING AND METHOD FOR BRAKE DISC MANUFACTURING

(71) Applicant: Q-CARBON MATERIAL CO., LTD., Shanghai (CN)

(72) Inventors: Fuqiang Shen, Shanghai (CN); Yalin Sun, Shanghai (CN); Jing Zhang, Shanghai (CN); Kun Yan, Shanghai (CN)

(73) Assignee: Q-CARBON MATERIAL CO., LTD., Shanghai (CN)

( * ) Notice: Subject to any disclaimer, the term of this patent is extended or adjusted under 35 U.S.C. 154(b) by 0 days.

(21) Appl. No.: 19/192,623

(22) Filed: Apr. 29, 2025

Related U.S. Application Data

(63) Continuation-in-part of application No. PCT/CN2023/100959, filed on Jun. 19, 2023.

(30) Foreign Application Priority Data

Nov. 1, 2022 (CN) .......................... 202211356978.2

(51) Int. Cl.
*B29B 7/00* (2006.01)
*B28B 5/00* (2006.01)
*B28B 7/18* (2006.01)
*F16D 65/12* (2006.01)

(52) U.S. Cl.
CPC .............. *B28B 7/186* (2013.01); *B28B 5/00* (2013.01); *F16D 65/126* (2013.01); *F16D 2200/0052* (2013.01); *F16D 2250/00* (2013.01); *F16D 2250/0046* (2013.01)

(58) Field of Classification Search
CPC .............. B28B 5/00; B28B 7/00; B28B 7/186
See application file for complete search history.

(56) References Cited

U.S. PATENT DOCUMENTS

2017/0211644 A1   7/2017   Carminati et al.

FOREIGN PATENT DOCUMENTS

| CN | 102424946 | A | 4/2012 |
|---|---|---|---|
| CN | 103030417 | A | 4/2013 |
| CN | 108644260 | A | 10/2018 |
| CN | 209408825 | U | 9/2019 |
| CN | 115570664 | A | 1/2023 |

(Continued)

OTHER PUBLICATIONS

International Search Report in PCT/CN2023/100959 mailed on Aug. 8, 2023, 7 pages.

(Continued)

*Primary Examiner* — Edmund H Lee
(74) *Attorney, Agent, or Firm* — Porus IP LLC (57) ABSTRACT

The present disclosure provides a tooling mold for brake disc manufacturing and a method for brake disc manufacturing. The tooling mold includes plugging segments, wherein a shape of each of the plugging segments is consistent with a shape of each of heat dissipation holes, and interference fit is achieved after plugging, an end portion of each of the plugging segments being fixedly connected with a chute through a connecting rod; and slider plates each of which adopts a curved structure with a uniform thickness, wherein each of the slider plates matches with each chute to realize position adjustment of the plugging segments.

5 Claims, 7 Drawing Sheets

(56) References Cited

FOREIGN PATENT DOCUMENTS

| | | | |
|---|---|---|---|
| CN | 218928162 U | | 4/2023 |
| JP | 2007187306 A | | 7/2007 |
| SE | 311493 | * | 6/1969 |

OTHER PUBLICATIONS

Written Opinion in PCT/CN2023/100959 mailed on Aug. 8, 2023, 6 pages.

\* cited by examiner

TOOLING MOLD FOR BRAKE DISC MANUFACTURING AND METHOD FOR BRAKE DISC MANUFACTURING

CROSS-REFERENCE TO RELATED APPLICATIONS

This application is a Continuation-in-part of International Application No. PCT/CN2023/100959, filed on Jun. 19, 2023, which claims priority to Chinese Patent Application No. 202211356978.2, filed on Nov. 1, 2022, the entire contents of each of which are incorporated herein by reference.

TECHNICAL FIELD

The present disclosure relates to the technical field of tooling molds, and in particular to a tooling mold for brake disc manufacturing and a method for brake disc manufacturing using the tooling mold.

BACKGROUND

Brake discs are critical components of an automotive braking system, specifically cooperating with calipers to achieve braking or deceleration through the clamping action between the calipers and the brake discs. The brake discs are categorized into a solid disc and a ventilated disc based on structural configuration. The ventilated disc features a plurality of radially oriented holes to facilitate heat dissipation during braking, thereby enhancing the performance. In terms of material composition, the brake discs may include metallic materials, fiber composite materials, or similar materials.

The ventilated disc made of the fiber composite materials is manufactured through a corresponding densification process to achieve product formation and performance enhancement. However, the preform after vapor deposition densification becomes extremely hard, making it difficult to drill holes on the surface of the preform, which leads to low efficiency, high cost, and a tendency to generate micro-cracks. In addition, subsequent siliconization treatment of the brake disc subjected to hole machining but not mold plugging after vapor deposition results in high surface roughness on the inner walls of the heat dissipation holes; furthermore, the micro-cracks generated during the prior drilling process may further cause silicon streaks on the product surface, leading to a low yield rate, which jointly reduce the uniformity of airflow rate during high-speed rotation, adversely affecting dynamic balance. Moreover, the internal holes of such brake disc are challenging to machine precisely in subsequent processes, requiring extended machining time. The high surface roughness of the inner walls of the heat dissipation holes also negatively impacts the heat dissipation effect during rapid rotation.

In the manufacturing process of such brake disc, in order to reduce the inner surface roughness of the heat dissipation holes, prevent dynamic imbalance during high-speed rotation, improve the heat dissipation effect, lower the machining difficulty of the heat dissipation holes, reduce overall production costs, and increase the product yield rate, the tooling mold and the method for brake disc manufacturing described in the present disclosure are provided. Specifically, hole machining is performed immediately after resin curing of the brake disc preform, significantly reducing the machining difficulty. Even if the micro-cracks are generated during hole machining on the preform, the micro-cracks can be filled and eliminated during subsequent vapor deposition, thereby reducing deposition time and material consumption. Furthermore, during the siliconization process, the plugging segments of the tooling mold are pressed into the heat dissipation holes to achieve interference fit, which effectively minimizes or eliminates non-uniform material accumulation on the inner surfaces of the holes, thereby improving surface finish of the heat dissipation holes, reducing post machining, enhancing the uniformity of product materials and expansion coefficients thereof, decreasing the crack formation rate, and ensuring the dynamic balance of the brake disc.

SUMMARY

The present disclosure provides a tooling mold for brake disc manufacturing and a method for brake disc manufacturing, which solve the above problems.

The tooling mold for brake disc manufacturing provided by the present disclosure is used in the manufacturing process of the fiber brake disc. The plugging segments of the tooling mold are inserted into the heat dissipation holes of the brake disc to achieve interference fit, which improves the inner surface finish of the heat dissipation holes in the densification process, and reduces dynamic imbalance and non-uniformity of airflow rate caused by the high roughness of the holes.

One or more embodiments of the present disclosure provide a tooling mold for brake disc manufacturing, used for mold plugging of heat dissipation holes on an outer peripheral side of a semi-finished brake disc of a carbon-carbon composite material after preliminary machining. The tooling mold may comprise: plugging segments, wherein a shape of each of the plugging segments is consistent with a shape of each of the heat dissipation holes provided on the outer peripheral side of the semi-finished brake disc, and interference fit is achieved after plugging, an end portion of each of the plugging segments being fixedly connected with a chute through a connecting rod; and slider plates each of which adopts a curved structure with a uniform thickness, wherein each of the slider plates matches with each chute.

In some embodiments, the chute may adopt a curved structure corresponding to the curved structure of each of the slider plates, and the chute may include a retention flange which slidably matches with each of the slider plates.

In some embodiments, the plugging segments may be made of a ceramic material or a composite material; and the composite material may include the carbon-carbon composite material, and a carbon-ceramic composite material.

One or more embodiments of the present disclosure provide a method for brake disc manufacturing using a tooling mold for brake disc manufacturing. The method for brake disc manufacturing may comprise: S1, fabricating a disc body preform of a carbon-carbon composite material; S2, performing resin impregnation or spraying treatment on the disc body preform; S3, curing and drying the disc body preform to obtain the disc body preform with a curing density of 0.4 g/cm$^3$-1.2 g/cm$^3$, wherein a temperature of room temperature curing is in a range of 20° C.-80° C., and a curing duration is in a range of 24 h-48 h; a maximum temperature of high temperature curing is in a range of 200° C.-300° C., and a holding duration of the maximum temperature is in a range of 2 h-6 h; S4, performing surface grooving and hole machining on the disc body preform obtained after curing and drying based on a shape of the brake disc to obtain a brake disc blank, wherein a peripheral side of the brake disc blank is surrounded by heat dissipation holes, and a hole diameter of each of the heat dissipation holes is less than a hole diameter of each of holes of a finished brake disc; S5, introducing a mixed gas of methane and propane or other hydrocarbon gases into the brake disc blank formed after surface grooving and hole machining, wherein a gas flow rate is controlled to be in a range of 50-300 L/min, and a deposition pressure is controlled to be in a range of 50 Pa-10 kPa, performing a repeated vapor deposition process for 200 h-2000 h at a temperature of 950° C.-1800° C. to obtain the brake disc blank with a density of 1.25 g/cm$^3$-1.75 g/cm$^3$, and then performing a finishing process on the brake disc blank to form a semi-finished brake disc after the vapor deposition process and the finishing process; S6, performing a siliconization process on the semi-finished brake disc using the tooling mold, including: arranging around at least two sets of slider plates based on a count of the heat dissipation holes disposed on the peripheral side of the semi-finished brake disc and a diameter of the semi-finished brake disc, and providing plugging segments corresponding to positions and the count of the heat dissipation holes on the slider plates to form a complete circular adjustment structure; after lateral adjustment of the plugging segments on the slider plates, extruding and inserting the plugging segments into the heat dissipation holes at the corresponding positions, and spraying a high temperature mold release additive on surfaces of the plugging segments and the slider plates before the inserting to facilitate subsequent mold release; after the inserting, putting the semi-finished brake disc into a graphite boat covered with silicon powder, a particle size of the silicon powder being controlled to be in a range of 5 μm-1.5 mm, performing the siliconization process at a temperature of 1400° C.-1800° C., and controlling a siliconizing time to be in a range of 30 min-6 h after a specified siliconization temperature is reached, so that silicon penetrates into the semi-finished brake disc until the density of the semi-finished brake disc rises to 2 g/cm$^3$-2.8 g/cm$^3$ after weighing and density measurement, so as to obtain the semi-finished brake disc after the siliconization process; S7, after the siliconization process is completed, pulling out T-shaped structures formed by chutes on connecting rods of the plugging segments from the heat dissipation holes by stretching, and disengaging the plugging segments from the slider plates in sequence to complete use of the tooling mold; and finally obtaining the finished brake disc after weighing, density measurement, refinement machining, and a dynamic balancing test of the semi-finished brake disc.

In some embodiments, the silicon powder may be doped with other high temperature resistant powders, and the other high temperature resistant powders may include boron nitride, silicon carbide, tungsten carbide, zirconium oxide, alumina, aluminum nitride, titanium diboride, and hafnium carbide.

BRIEF DESCRIPTION OF THE DRAWINGS

In order to more clearly illustrate the embodiments of the present disclosure, the accompanying drawings required to be used in the description of the embodiments are briefly described below. Obviously, the accompanying drawings in the following description are only some examples or embodiments of the present disclosure, and it is possible for those having ordinary skills in the art to obtain other drawings in accordance with these drawings without creative labor.

In the accompanying drawings, a list of components represented by reference signs is shown below:

1—plugging segment, 101—connecting rod, 102—chute, 2—slider plate, A—disc body preform, B—brake disc blank, 3—heat dissipation hole, C—semi-finished brake disc.

DETAILED DESCRIPTION

Embodiments of the present disclosure will be clearly and completely described below with reference to the accompanying drawings in the embodiments of the present disclosure, and it is clear that the embodiments described are only a portion of embodiments in the present disclosure and not all of the embodiments. All other embodiments obtained by those having ordinary skills in the art based on the embodiments in the present disclosure without creative labor fall within the scope of protection of the present disclosure.

In the description of the present disclosure, it is understood that the terms "peripheral side," "end portion," "inner," or the like, indicate orientation or positional relationships only for the purpose of facilitating the description of the present disclosure and simplifying the description, and do not indicate or imply that the component or element referred to must have a particular orientation and be constructed and operated in a particular orientation, and therefore are not to be construed as limitations on the present disclosure.

Figure 1:
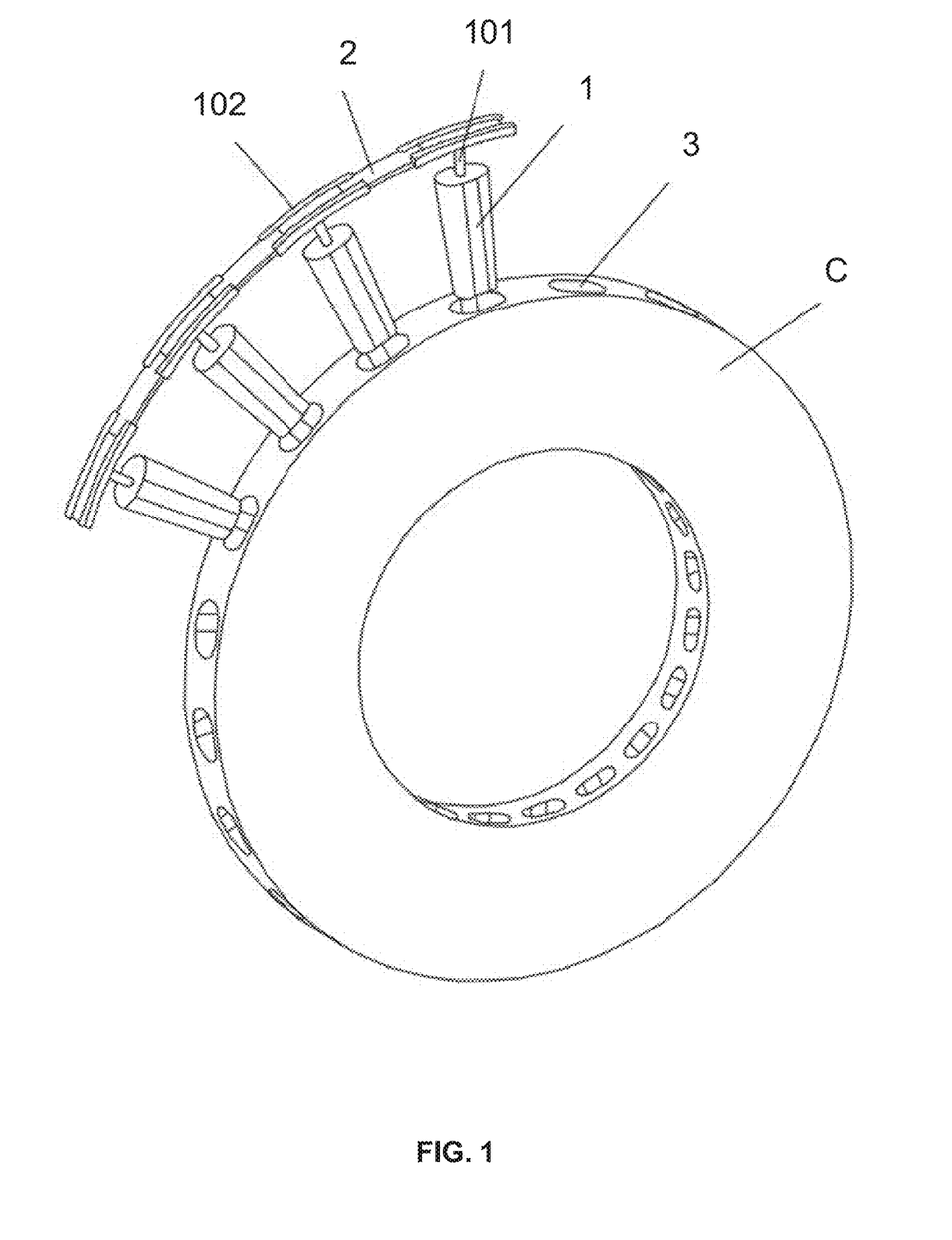
FIG. 1 is a schematic structure diagram illustrating a fit between a tooling mold for brake disc manufacturing and a semi-finished brake disc according to some embodiments of the present disclosure.

FIG. 1 is a schematic structure diagram illustrating a fit between a tooling mold for brake disc manufacturing and a semi-finished brake disc according to some embodiments of the present disclosure.

In some embodiments, referring to FIG. 1, the tooling mold for brake disc manufacturing of the present disclosure may include plugging segments 1, connecting rods 101, chutes 102, slider plates 2, heat dissipation holes 3, and a semi-finished brake disc C.

In some embodiments, the tooling mold may be configured to perform mold plugging on the heat dissipation holes 3 within an outer peripheral side of the semi-finished brake disc C of a carbon-carbon composite material after preliminary machining. For example, the tooling mold may be configured to perform mold plugging on the heat dissipation holes 3 within the outer peripheral side of the semi-finished brake disc C of a fiber composite material after preliminary machining and vapor deposition.

Mold plugging is an operation of inserting or placing a specific part in the tooling mold to form a specific structure.

In some embodiments, a disc body preform of the carbon-carbon composite material (also referred to as a carbon fiber composite material) may be selected to perform curing, vapor deposition, and a siliconization process on the disc body preform to improve the overall material performance of the brake disc. The semi-finished brake disc C of the carbon-carbon composite material with a hole structure may be formed by a disc body preform A of the carbon-carbon composite material after resin curing, grooving, and hole machining, and then a brake disc blank B after vapor deposition and finishing.

Figure 4:
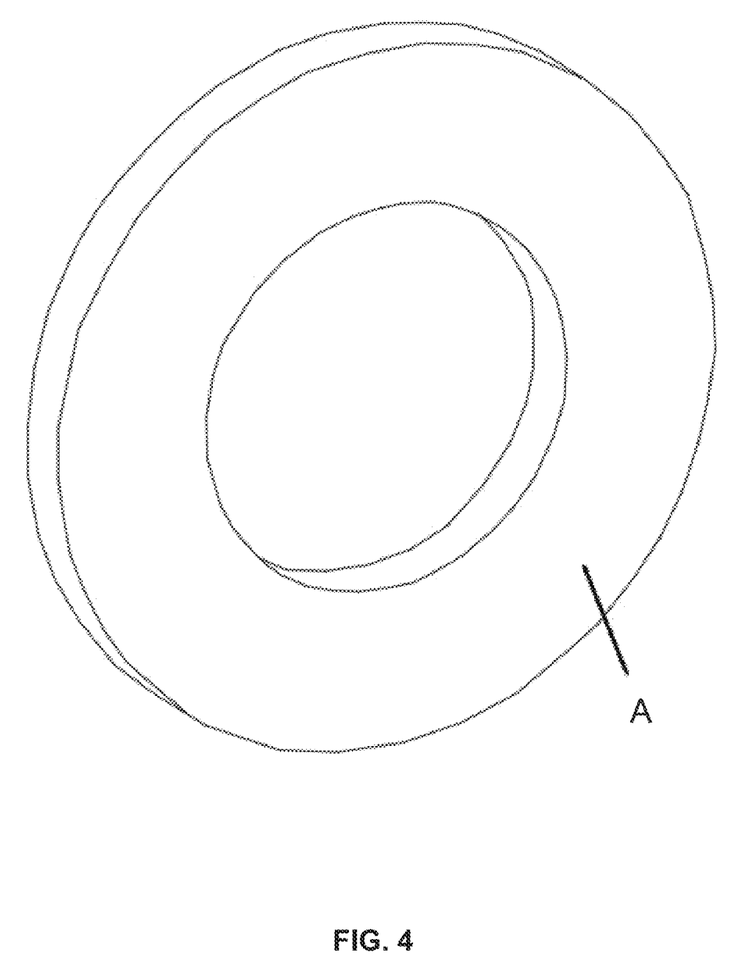
FIG. 4 is a schematic structural diagram illustrating a disc body preform according to some embodiments of the present disclosure.

FIG. 4 is a schematic structural diagram illustrating a disc body preform according to some embodiments of the present disclosure.

In some embodiments, relevant dimensions of the disc body preform A may be set according to an actual situation. For example, an outer diameter size of the disc body preform A is 350 mm, an inner diameter size of the disc body preform A is 200 mm, a thickness of the disc body preform A is 30 mm, etc. The structure of the disc body preform A is shown in FIG. 4.

Figure 5:
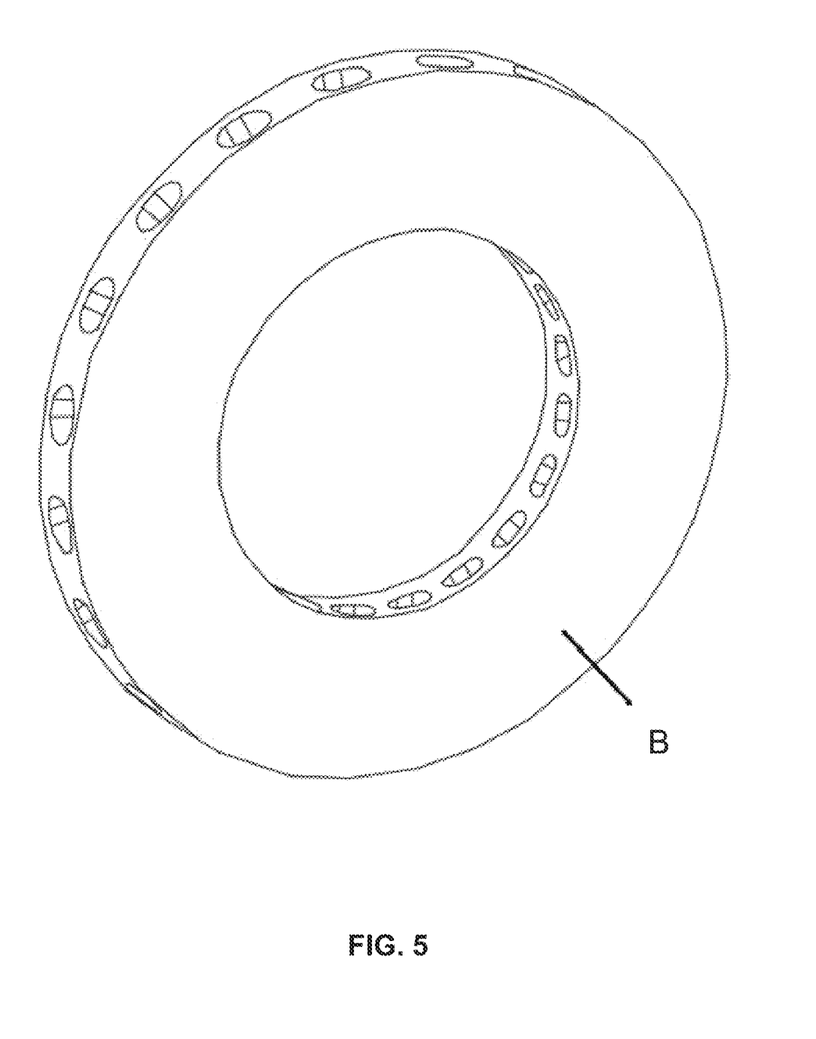
FIG. 5 is a schematic structural diagram illustrating a brake disc blank according to some embodiments of the present disclosure.

FIG. 5 is a schematic structural diagram illustrating a brake disc blank according to some embodiments of the present disclosure.

In some embodiments, the structure of the brake disc blank B is shown in FIG. 5. By repeated vapor deposition of the brake disc blank B, after the brake disc blank B achieves a certain density by densification, the semi-finished brake disc C is obtained by a finishing process, and then the tooling mold of the present disclosure is used for a subsequent siliconization process.

Figure 3:
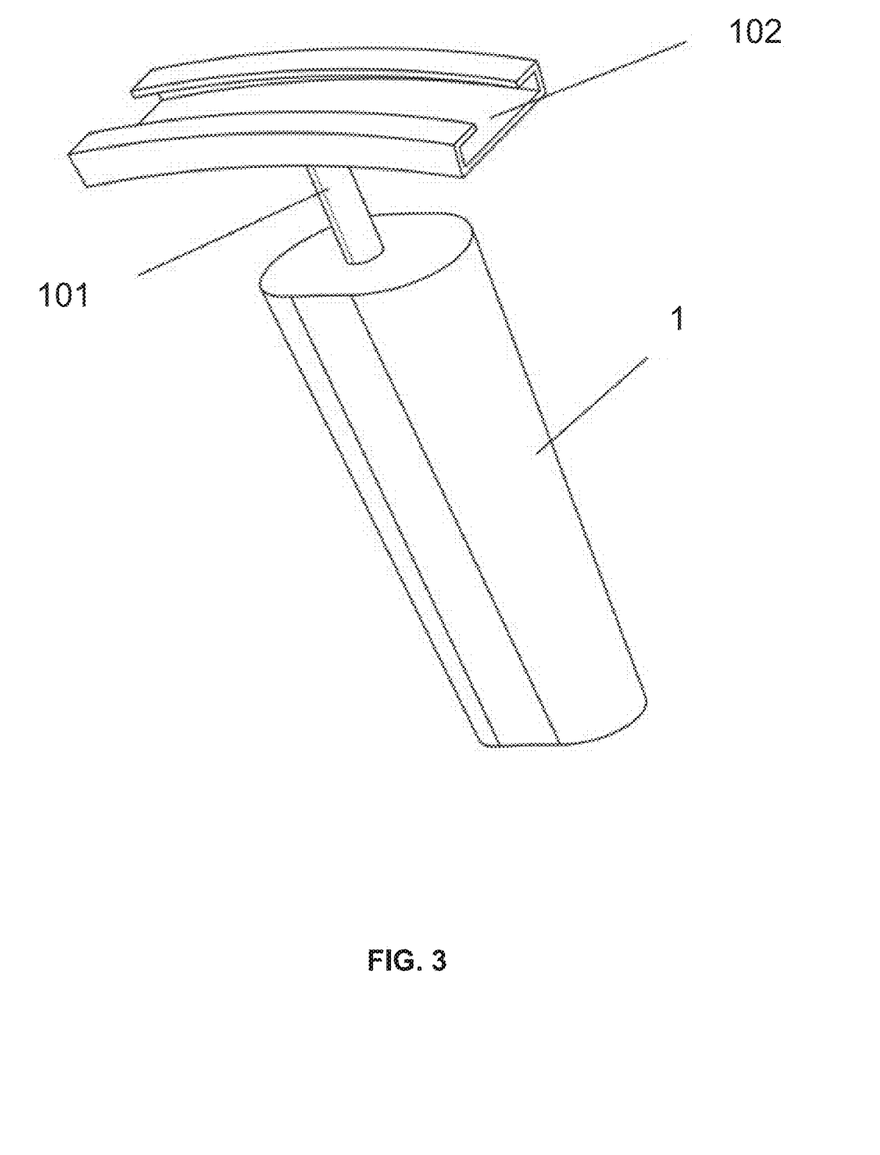
FIG. 3 is a schematic structural diagram illustrating a plugging segment according to some embodiments of the present disclosure.

FIG. 3 is a schematic structural diagram illustrating a plugging segment according to some embodiments of the present disclosure.

In some embodiments, the tooling mold may include: the plugging segments 1. A shape of each of the plugging segments 1 may be consistent with a shape of each of the heat dissipation holes 3 provided on an outer peripheral side of the semi-finished brake disc C, and interference fit may be achieved after plugging. An end portion of each of the plugging segments 1 may be fixedly connected with the chute 102 through the connecting rod 101. A manner of fixed connection may include welding, etc.

The plugging segments 1 are mold components performing interference fit with the heat dissipation holes 3. The heat dissipation holes 3 (also referred to as holes, or apertures) are airflow passages provided in a circumferential direction of a product (e.g., the semi-finished brake disc, the brake disc blank, etc.) associated with brake disc manufacturing. The structure of one of the plugging segments 1 may be as shown in FIG. 3.

In some embodiments, the plugging segments 1 may be made of a ceramic material or a composite material. The composite material may include a carbon-carbon composite material, a carbon-ceramic composite material, etc.

In some embodiments of the present disclosure, the plugging segments 1 may be made of the ceramic material or the composite material, and the plugging segments 1 perform the interference fit with the heat dissipation holes 3, which can reduce the rate of material penetration at a high temperature during the siliconization process, and facilitate the uniformity of product materials, thereby ensuring the uniformity of the expansion coefficient and reducing product cracking.

In some embodiments, the tooling mold may further include the slider plates 2. Each of the slider plates 2 has a curved structure that is concentric with the semi-finished brake disc C and has a uniform thickness. Each of the slider plates 2 cooperates with the chute 102 to realize position adjustment of each of the plugging segments 1.

In some embodiments, the chute 102 adopts a curved structure corresponding to the curved structure of each of the slider plates 2, and the chute includes a retention flange which slidably matches with each of the slider plates 2.

The retention flange is a projection or edge structure along an inner edge of the chute 102 for limiting a movement range of the slider plate 2 within the chute 102.

In some embodiments, the slider plates 2 may be made of a metallic material, a graphite material, the ceramic material, the composite material, etc. The composite material may include the carbon-carbon composite material, the carbon-ceramic composite material, etc. For example, the slider plates 2 are made of the graphite material.

In some embodiments of the present disclosure, by providing the curved retention flange corresponding to the slider plate 2 in the chute 102, the tooling mold enhances the positioning accuracy of the slider plate 2 and reduces the risk of the slider plate 2 disengaging from the chute 102.

In some embodiments of present disclosure, the shape of each of the plugging segments 1 is consistent with the shape of each of the heat dissipation holes 3 of the semi-finished brake disc C, which ensures the machining accuracy and structural stability, and optimizes the heat dissipation performance. Meanwhile, the cooperation of the chutes 102 and the slider plates 2 achieves the position adjustment of the plugging segments 1, and good adaptability to meet diversified needs. The cooperation of the slider plates 2 and the plugging segments 1 achieves positioning of the heat dissipation holes 3, which reduces the problem of uneven stress release of the machined surface during high temperature treatment, ensures the integrity of the heat dissipation holes 3, and reduces the collapse of edges, holes, and cracks.

In some embodiments, the tooling mold may further include a control system. The control system may be configured to process information and/or data from the process of brake disc manufacturing. For example, the control system includes a processor, a programmable logic controller (PLC), etc.

Figure 6:
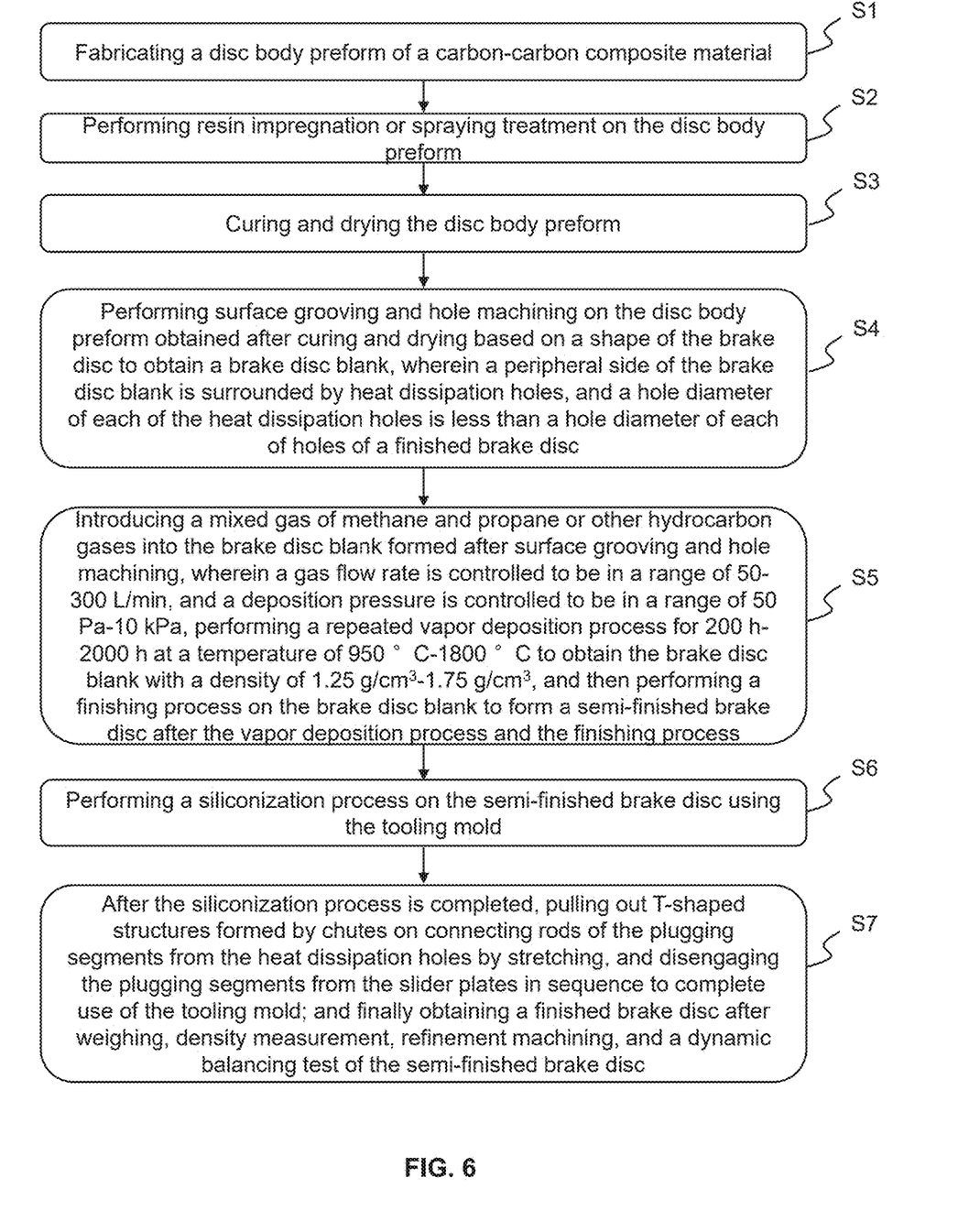
FIG. 6 is a flowchart illustrating an exemplary method for brake disc manufacturing according to some embodiments of the present disclosure.

FIG. 6 is a flowchart illustrating an exemplary method for brake disc manufacturing according to some embodiments of the present disclosure.

In some embodiments, as shown in FIG. 6, the method for brake disc manufacturing using the tooling mold for brake disc manufacturing as described may include the following operations.

S1, a disc body preform of a carbon-carbon composite material may be fabricated.

The disc body preform refers to a fiber skeleton with a certain shape and structure that is pre-formed by a specific process during molding of the composite material.

In some embodiments, a carbon-carbon composite prepreg is machined into a disc body preform (e.g., the disc body preform A) that meets design parameters by performing fiber placement, molding and laser trimming based on computer numerical control (CNC) and other technologies.

In some embodiments, a shape of the disc body preform may be set according to actual needs.

S2, resin impregnation or spraying treatment may be performed on the disc body preform.

In some embodiments, the resin impregnation or spraying treatment is performed on the disc body preform for densification, a resin being an epoxy or phenolic resin. For example, the resin impregnation treatment is performed on the disc body using the phenolic resin.

S3, the disc body preform may be cured and dried.

In some embodiments, the disc body preform after the resin impregnation treatment is cured and dried to obtain the disc body preform with a curing density of 0.4 g/cm$^3$-1.2 g/cm$^3$. A resin curing process may be divided into room temperature curing and high temperature curing.

In some embodiments, a temperature of the room temperature curing may be in a range of 20° C.-80° C., and a curing duration may be in a range of 24 h-48 h; a maximum temperature of the high temperature curing may be in a range of 200° C.-300° C., and a holding duration of the maximum temperature may be in a range of 2 h-6 h. For example, if the high temperature curing is adopted, the maximum temperature of the high temperature curing is 250° C., the holding duration of the maximum temperature is 3 h, and the disc body preform with a curing density of 0.7 g/cm$^3$ is obtained.

S4, surface grooving and hole machining may be performed on the disc body preform obtained after curing and drying based on a shape of the brake disc to obtain a brake disc blank, a peripheral side of the brake disc blank being surrounded by heat dissipation holes, and a hole diameter of each of the heat dissipation holes being less than a hole diameter of each of holes of a finished brake disc.

The brake disc blank (e.g., the brake disc blank B) is an intermediate product that completes preliminary molding but not undergoes final densification.

In some embodiments, subsequent finishing can be facilitated by setting the hole diameter of each of the heat dissipation holes (e.g., the heat dissipation holes 3) to be less than the hole diameter of each of the holes of the finished brake disc (also referred to as a finished brake disc product).

In some embodiments, a diameter difference may be determined to be in a range of a few micrometers or a few millimeters depending on the diameters of different sizes of holes. For example, the diameter difference between the hole diameter of each of the heat dissipation holes and the hole diameter of each of the holes of the finished brake disc is 8 μm.

In some embodiments, during machining, the difficulty of hole machining and finishing is reduced due to the fact that the density of the disc body preform after curing and drying is lower than a density of a preform obtained after conventional vapor deposition.

In some embodiments, the operation S4 may further include performing surface grooving and hole machining on the disc body preform obtained after curing and drying based on the shape of the brake disc and first design values the heat dissipation holes to obtain the brake disc blank, wherein the peripheral side of the brake disc blank being surrounded by the heat dissipation holes, and the hole diameter of each of the heat dissipation holes being less than the hole diameter of each of holes of the finished brake disc.

In some embodiments, a control system may determine the first design values of the heat dissipation holes based on a finished product specification, a curing parameter, and a spraying amount of a high temperature mold release additive.

The finished product specification refers to a feature associated with the finished brake disc. For example, the finished product specification includes a finished hole specification, an overall dimension of the finished brake disc, a density of the finished brake disc, etc.

In some embodiments, the finished product specification may be obtained by those skilled in the art in a present manner. For example, a feature of the finished brake disc obtained by using mechanics simulation software as the finished product specification.

The finished hole specification refers to an expected hole feature of the finished brake disc. For example, the finished hole specification includes a hole diameter, a hole depth ratio, a hole distribution pattern (e.g., a radial pattern, a spiral pattern, a matrix, a count of holes, etc.), etc.

In some embodiments, the control system may determine the finished hole specification based on a braking performance requirement. The braking performance requirement may include a vehicle type, a coefficient of friction stability, etc.

The vehicle type refers to a type of vehicle equipped with the brake disc. For example, the vehicle type includes a high-performance vehicle, a family vehicle, etc.

The vehicle type determines a heat dissipation requirement of the brake disc, which in turn affects the design of the heat dissipation holes. For example, the high-performance vehicle (e.g., a race car, a heavy-duty truck, etc.) requires larger and more dense heat dissipation holes to cope with extreme braking temperature rise. The family vehicle, on the other hand, requires smaller and fewer heat dissipation holes, which ensures the quiet effect of the vehicle and improves the service life of the vehicle.

The coefficient of friction stability refers to an ability of a braking system of the vehicles to maintain stable friction performance. When the count of heat dissipation holes of the brake disc is too high, an effective friction contact area is reduced.

Accordingly, a scientific distribution of the heat dissipation holes is needed to maintain an even braking force output. Maintaining a stable coefficient of friction ensures predictable performance of mechanical systems such as brakes, bearings, and transmissions, avoiding the risk of loss of control or failure due to sudden changes in the coefficient of friction. The coefficient of friction stability may be determined based on actual experimentation.

In some embodiments, the control system may determine the finished hole specification based on the braking performance requirement through a first preset comparison table.

In some embodiments, the first preset comparison table may include a correspondence between the braking performance requirement and the finished hole specification. In some embodiments, the first preset comparison table may be determined by those skilled in the art based on prior experience or experimentation.

In some embodiments of the present disclosure, by considering different vehicles types and different coefficients of friction stability, the control system obtains finished hole specification that matches the actual application of the finished brake disc, which helps to achieve an optimal braking effect.

The curing parameter refers to an actual value corresponding to a key control variable in the resin curing process. For example, the curing parameter includes a curing temperature type (e.g., the high temperature curing, the room temperature curing, etc.), an actual curing temperature, and a holding duration of the curing temperature. The curing parameter may be determined by those skilled in the art based on an actual input to the resin curing process, or determined by a direct readout from the control system.

The first design value refers to the hole diameter of each of the heat dissipation holes when the brake disc blank is formed, i.e., a design value of a roughly machined heat dissipation hole.

In some embodiments, the control system may determine the first design values of the heat dissipation holes based on the finished product specification, the curing parameters, and the spraying amount of the high temperature mold release additive through a hole model.

The hole model may be a machine learning model. For example, the hole model is a Deep Neural Network (DNN) model, or the like.

An input of the hole model may include the finished product specification, the curing parameter, and the spraying amount of the high temperature mold release additive. An output of the hole model may include the first design value.

In some embodiments, the hole model may be obtained by training based on a plurality of first training samples with first labels. The plurality of first training samples with the first labels may be input into an initial hole model, a value of a loss function may be determined from the first labels and results of the initial hole model, and the initial hole model may be iteratively updated based on the value of the loss function. The model training is completed when a preset condition is satisfied, and a trained hole model is obtained. The preset condition may include convergence of loss function, a count of iterations reaching a threshold, or the like.

In some embodiments, the first training samples for training the hole model may include a sample finished product specification, a sample curing parameter, and a sample spraying amount of the high temperature mold release additive from historical preferred sample data. The first labels may include an actual first design value. The actual first design value may be an actual measured hole diameter of the heat dissipation hole.

The historical preferred sample data refers to valid reference samples screened from historical data. Screening criteria may include that a difference between the first design value and a subsequent second design value is less than or equal to a difference threshold, and that finished brake discs corresponding to the historical data are all qualified (e.g., no cracks, the dynamic balance reaching a standard, etc.). The difference threshold may set by default by those skilled in the art.

In some embodiments, if a size allowance left by the heat dissipation hole after rough machining is too large, the subsequent finishing time may increase and the cost may rise. If the size allowance left by the heat dissipation hole after rough machining is too small, the subsequent finishing may not be able to correct a rough machining error and may produce scrap. Accordingly, by reasonably controlling the first design value, the time and cost of the subsequent finishing can be minimized while guaranteeing the accuracy of the hole diameter of the heat dissipation holes, thereby improving the production efficiency and reducing cost.

In some embodiments, as one of the curing parameters, the holding duration of the curing temperature influences deformation of the heat dissipation holes. If the holding duration of the curing temperature is insufficient, resulting in incomplete drying, the heat dissipation holes are susceptible to deformation during subsequent machining, which increases the scrap rate. Accordingly, in the design of the hole model, the appropriate first design value is determined by considering the curing parameter, so as to avoid the deformation and scrap caused by excessive pursuit of less allowance while ensuring the accuracy.

S5, a mixed gas of methane and propane or other hydrocarbon gases may be introduced into the brake disc blank formed after surface grooving and hole machining, a gas flow rate being controlled to be in a range of 50-300 L/min, and a deposition pressure being controlled to be in a range of 50 Pa-10 kPa, a repeated vapor deposition process may be performed for 200 h-2000 h at a temperature of 950° C.-1800° C. to obtain the brake disc blank with a density of 1.25 g/cm$^3$-1.75 g/cm$^3$, and then a finishing process may be performed on the brake disc blank to form a semi-finished brake disc after the vapor deposition process and the finishing process.

In some embodiments, the repeated vapor deposition process may be performed on the brake disc blank to obtain the brake disc blank with the density of 1.25 g/cm$^3$-1.75 g/cm$^3$, and after reaching a preset density, the finishing process may be performed on the shape of the brake disc blank to obtain the semi-finished brake disc (e.g., the semi-finished brake disc C).

In some implementations, a propane gas is selected as a deposition gas source, and the deposition pressure is controlled at 4 kPa. Through experiments at different deposition temperatures, different deposition times, and different gas flow rates, semi-finished brake discs with different densities are obtained. Since the heat dissipation holes are provided on the brake disc blank, a total volume becomes smaller compared to conventional brake disc blanks without heat dissipation holes that require vapor deposition, and the time and consumption of raw materials for subsequent vapor deposition are reduced accordingly.

In some embodiments, the operation S5 may further include introducing the mixed gas of methane and propane or other hydrocarbon gases into the brake disc blank formed after surface grooving and hole machining, the gas flow rate being controlled to be in the range of 50-300 L/min, and the deposition pressure being controlled to be in the range of 50 Pa-10 kPa, performing he repeated vapor deposition process for 200 h-2000 h at the temperature of 950° C.-1800° C. to obtain the brake disc blank with the density of 1.25 g/cm$^3$-1.75 g/cm$^3$, and then performing the finishing process on the brake disc blank based on second design values of the heat dissipation holes to obtain the semi-finished brake disc after the vapor deposition process and the finishing process.

In some embodiments, the control system may determine the second design values based on the first design values, a present deposition parameter, and a size of each of the plugging segments.

The present deposition parameter refers to a parameter associated with vapor deposition. For example, the present deposition parameter includes a gas flow rate, a deposition pressure, a deposition time, a deposition temperature, or the like. The present deposition parameter may be preset by those skilled in the art.

The size of each of the plugging segments may include a length, a width, and a diameter of the plugging segment.

The second design values are hole diameters of the heat dissipation holes of the semi-finished brake disc after the vapor deposition process and the finishing process.

In some embodiments, the control system may determine the second design values based on the first design values, the present deposition parameter, and the size of each of the plugging segments through a second preset comparison table.

In some embodiments, the second preset comparison table may include a correspondence between the first design value, the present deposition parameter, the size of each of the plugging segments, and the second design value. In some embodiments, the second preset comparison table may be preset by those skilled in art based on simulation software.

By determining the second design values of the heat dissipation holes, the heat dissipation holes that meet a specific requirement can be obtained. For example, the specific requirement includes that the plugging segments can be easily pulled out of the heat dissipation holes, the heat dissipation holes are complete with no collapse of edges, and the heat dissipation holes have a good inner surface finish.

In some embodiments of the present disclosure, by considering the first design values and the second design values, the machining time can be saved while guaranteeing the quality of the machining process.

S6, a siliconization process may be performed on the semi-finished brake disc using the tooling mold.

Figure 2:
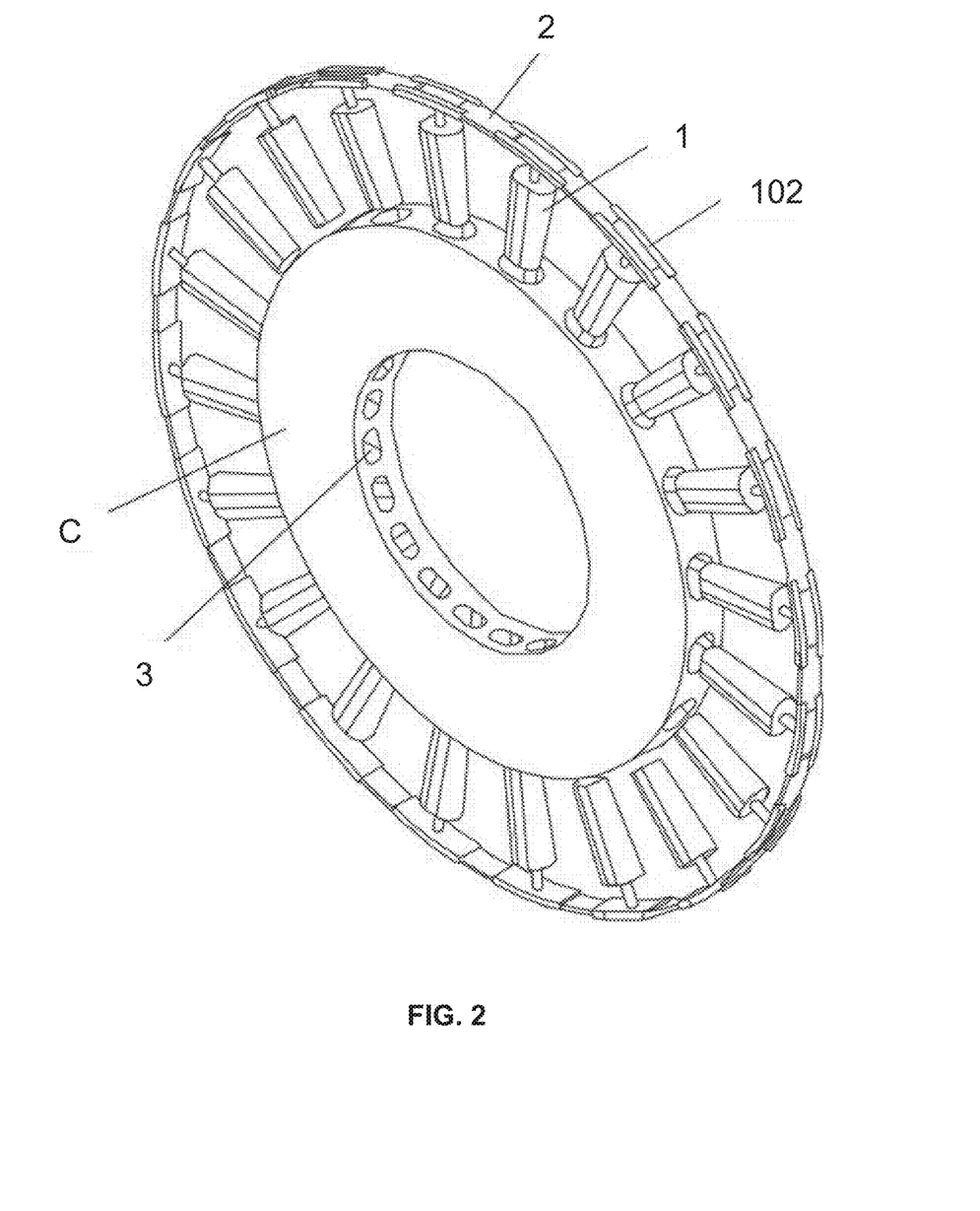
FIG. 2 is a schematic diagram illustrating a usage state in which a plurality of sets of tooling molds for brake disc manufacturing are mounted on an outer peripheral side of a semi-finished brake disc to form a surrounding structure according to some embodiments of the present disclosure.

In some embodiments, at least two sets of slider plates (e.g., the slider plates 2) are arranged around based on a count of the heat dissipation holes disposed on the peripheral side of the semi-finished brake disc, and a diameter of the semi-finished brake disc (also referred to as a disc body, or a product), and plugging segments (e.g., the plugging segments 1) are provided corresponding to positions and the count of the heat dissipation holes on the slider plates to form a complete circular adjustment structure. After lateral adjustment of the plugging segments 1 on the slider plates, the plugging segments are extruded and inserted into the heat dissipation holes at the corresponding positions, and the high temperature mold release additive is sprayed on surfaces of the plugging segments and the slider plates before the inserting to facilitate subsequent mold release. After the inserting, the semi-finished brake disc is put into a graphite boat covered with silicon powder, a particle size of the silicon powder being controlled to be in a range of 5 μm-1.5 mm. The siliconization process is performed at a temperature of 1400° C.-1800° C., and a siliconizing time is controlled to be in a range of 30 min-6 h after a specified siliconization temperature is reached, so that silicon penetrates into the semi-finished brake disc until the density of the semi-finished brake disc rises to 2 g/cm$^3$-2.8 g/cm$^3$ after weighing and density measurement, so as to obtain the semi-finished brake disc after the siliconization process. The density of the disc body reaches 2 g/cm$^3$-2.8 g/cm$^3$ by the siliconization process at a certain temperature and time.

The tooling mold of the embodiments of the present disclosure is capable of realizing the adjustment of spacings of the plugging segments disposed on the slider plates by the slider plates to form different sets of plugging segments in accordance with the slider plates, so that the overall adjustment is flexible, and combined spacing adjustment of the brake discs of different sizes can also be realized. The grouping of the slider plates and the plugging segments reduces storage and placement space, improves efficiency of mold insertion, and facilitates operation for an operator.

In some embodiments, the semi-finished brake disc may also be put into the graphite boat uniformly covered with the silicon powder, thereby ensuring that the silicon powder uniformly penetrates into the semi-finished brake disc at a high temperature, and avoiding localized silicon enrichment and deficiency.

In some embodiments, the siliconization process is performed on the semi-finished brake discs of different densities obtained in the operation S5, wherein a particle size of the silicon powder is controlled to be 1 mm, the siliconization process is carried out at 1600° C., and the siliconizing time is controlled to be 2 h.

In some embodiments, the silicon powder may be doped with other high temperature resistant powders, and the powders (also referred to as the other high temperature resistant powders) may include boron nitride, silicon carbide, tungsten carbide, zirconium oxide, alumina, aluminum nitride, titanium diboride, and hafnium carbide.

In some embodiments of the present disclosure, the silicon powder is doped with the other high temperature resistant powders, so that high temperature resistance of the tooling mold is enhanced, and wear resistance and mechanical strength of the tooling mold are optimized.

The high temperature mold release additive is a chemical material or coating that is effective in preventing the finished product from adhering to the surface of the mold in a high temperature environment. For example, boron amide is selected to help subsequent mold release.

In some embodiments, the control system may determine the spraying amount of the high temperature mold release additive based on the second design values and the size of each of the plugging segments.

The spraying amount is a mass or volume of the high temperature mold release additive applied per unit area or per unit volume to the surface of the plugging segment and the slider plate.

In some implementations, the control system may determine the spraying amount of the high temperature mold release additives based on the second design values and the size of each of the plugging segments through a first preset relationship. For example, the first present relationship may include a fit size of the interference fit between the heat dissipation holes and the plugging segments, which is positively correlated with the spraying amount.

The fit size refers to geometric parameters of mutually assembled parts (e.g., the heat dissipation holes and the plugging segments) in the interference fit.

In some embodiments, the control system may determine the spraying amount based on the siliconization temperature of the siliconization process through a second present relationship. For example, the second present relationship may include a positive correlation between the siliconization temperature and the spraying amount. If the siliconization temperature is high, the deformation due to the high temperature is large, and thus the plugging segments are less likely to be pulled out of the heat dissipation holes. With the second present relationship, it is possible to obtain a more appropriate spraying amount of the high temperature mold release additive.

In some embodiments of the present disclosure, by reasonably controlling the spraying amount, reliable mold release can be realized while preventing contamination of the holes caused by excessive spraying, and the cost can be saved.

S7, after the siliconization process is completed, T-shaped structures formed by chutes on connecting rods of the plugging segments may be pulled out from the heat dissipation holes by stretching, and the plugging segments may be disengaged from the slider plates in sequence to complete use of the tooling mold; and finally a finished brake disc may be obtained after weighing, density measurement, refinement machining, and a dynamic balancing test of the semi-finished brake disc.

In some embodiments, as shown in FIG. 3, the shape of the plugging segment 1 is consistent with the shape of the heat dissipation hole 3 and is capable of realizing interference fit during plugging, and the chute 102 on the plugging segment 1 adopts a curved structure, which realizes limiting and sliding cooperation with the slider plate 2 through a retention flange disposed on the chute 102. As shown in FIG. 1, the heat dissipation holes 3 are twenty holes evenly arranged around the periphery side of the semi-finished brake disc C. In a full load state, twenty plugging segments 1 corresponding to the twenty heat dissipation holes 3 are provided, and an arc length of the corresponding slider plate 2 is ¼, ⅕, or the like, of the brake disc 3, so as to form the complete circular adjustment structure. A thickness of an accommodation groove of the retention flange disposed on the chute 102 is at least twice the thickness of the slider plate 2.

FIG. 2 is a schematic diagram illustrating a usage state in which a plurality of sets of tooling molds for brake disc manufacturing are mounted on an outer peripheral side of a semi-finished brake disc to form a surrounding structure according to some embodiments of the present disclosure.

As shown in FIG. 2, FIG. 2 is a schematic structural diagram of the plugging segments 1 fitting five slider plates 2 in a full load state. After lateral adjustment of the plugging segments 1 on the corresponding slider plates 2, the plugging segments 1 are inserted into the corresponding heat dissipation holes 3. In this case, end portions of the adjacent slider plates 2 are inserted into accommodation grooves of retention flanges of the corresponding adjacent chutes 102 to achieve accommodation fit. After the siliconization process is completed, T-shaped structures formed by the chutes 102 on the connecting rods 101 of the plugging segments 1 are pulled out from the heat dissipation holes 3 by stretching, and the plugging segments are disengaged from the slider plates 2 in sequence.

According to the method for brake disc manufacturing in the embodiments of the present disclosures, first the preform is cured by resin, and then machining is performed after the disc body preform reaches a certain density, which reduces the difficulty of hole machining and finishing, and reduces the time and raw material consumption of subsequent vapor deposition, thereby lowering the production cost. The use of the tooling mold and the method for brake disc manufacturing using the tooling mold for brake disc manufacturing improve the inner surface finish of the heat dissipation holes, reduce the amount of post machining, avoid silicone streaks on the surface of the finished product, and reduce the dynamic imbalance of the brake disc and the non-uniformity of the airflow rate.

The method for brake disc manufacturing in the present disclosure is flexible in overall adjustment, and combined spacing adjustment can be realized for different sizes of brake discs, which is easy to operate. The method reduces the difficulty of hole machining in the preform of the brake disc of the carbon-carbon composite material and reduces the amount of machining; reduces the time required for vapor deposition of the brake disc and the consumption of raw materials; enhances the inner surface finish of the heat dissipation holes and reduces the amount of machining, and avoids the problem of dynamic imbalance and non-uniformity of the airflow rate caused by the roughness of the holes; facilitates the uniformity of the product materials, ensures the uniformity of the expansion coefficient, and reduces the probability of product cracking.

Figure 7:
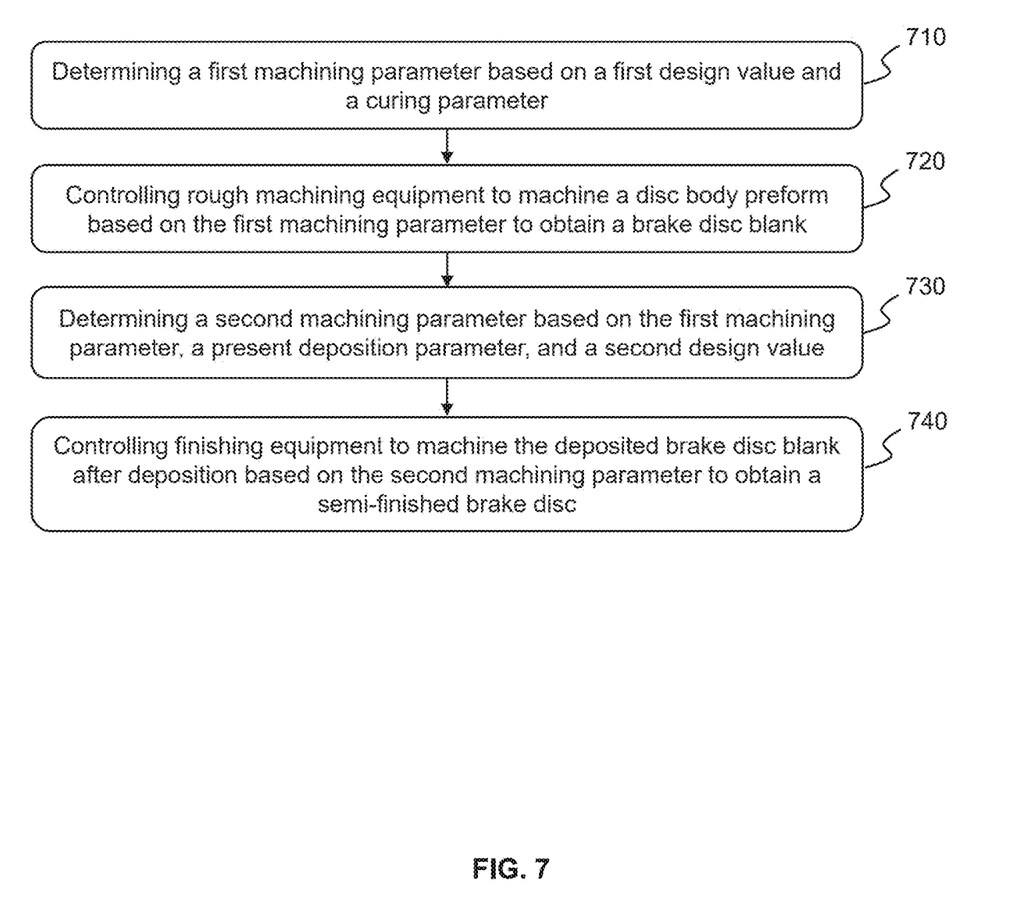
FIG. 7 is a flowchart illustrating an exemplary process of obtaining a semi-finished brake disc according to some embodiments of the present disclosure.

FIG. 7 is a flowchart illustrating an exemplary process of obtaining a semi-finished brake disc according to some embodiments of the present disclosure.

In some embodiments, a first machining parameter may be determined based on a first design value and a curing parameter; rough machining equipment may be controlled to machine a disc body preform based on the first machining parameter to obtain a brake disc blank; a second machining parameter may be determined based on the first machining parameter, a present deposition parameter, and a second design value; and finishing equipment may be controlled to machine the brake disc blank after deposition based on the second machining parameter to obtain the semi-finished brake disc. As shown in FIG. 7, the following operation are included.

In 710, a first machining parameter may be determined based on a first design value and a curing parameter.

More descriptions regarding the first design value and the curing parameter may be found in FIG. 6 and the related descriptions thereof.

The first machining parameter refers to a machining parameter for performing rough machining on heat dissipation holes. For example, the first machining parameter includes a drill speed, a hole machining sequence, or the like, involved in providing the heat dissipation holes in the operation S4. More descriptions regarding determining the first machining parameter may be found in operation 730 and the related descriptions thereof.

In 720, rough machining equipment may be controlled to machine a disc body preform based on the first machining parameter to obtain a brake disc blank.

The rough machining equipment refers to a machine or a tool that performs rough machining on the disc body preform. For example, the roughing equipment includes a lathe, a milling machine, a grinding machine, etc.

In some embodiments, the rough machining equipment may machine the disc body preform based on the first machining parameter to obtain the brake disc blank.

In 730, a second machining parameter may be determined based on the first machining parameter, a present deposition parameter, and a second design value.

The second machining parameter is a parameter for machining the heat dissipation holes of the brake disc blank after vapor deposition, i.e., the parameter involved in the machining of the heat dissipation holes in the operation S5.

In some embodiments, the first machining parameter and the second machining parameter may be determined based on a machining model.

In some embodiments, the machining model may be a machine learning model. The machining model may include a first prediction layer and a second prediction layer. Both the first and second prediction layers may be a DNN model.

In some embodiments, an input of the first prediction layer may include the first design value and the curing parameter, and an output of the first prediction layer may include the first machining parameter. An input of the second prediction layer may include the first machining parameter, the present deposition parameter, and the second design value, and an output of the second prediction layer may include the second machining parameter.

In some embodiments, the output of the first prediction layer may be used as the input of the second prediction layer. The first prediction layer and the second prediction layer may be obtained by joint training.

In some embodiments, second training samples for the joint training may include a sample first design value, a sample curing parameter, a sample present deposition parameter, and a sample second design value in historical preferred sample data, and labels may include an actual second machining parameter corresponding to the historical preferred sample data. The first design value and the curing parameter may be input into the first prediction layer to obtain the first machining parameter output by the first prediction layer; the first machining parameter may be used as the second training sample to be input into the second prediction layer together with the present deposition parameter and the second design value to obtain the second machining parameter output from the second prediction layer. A loss function may be constructed based on a sample second machining parameter and the second machining parameter output from the second prediction layer, and parameters of the first prediction layer and the second prediction layer may be synchronously updated. A trained first prediction layer and a trained second prediction layer may be obtained by parameter updating. More descriptions regarding the historical preferred sample data may be found in FIG. 6 and the related descriptions thereof. The first prediction layer and the second prediction layer may be obtained by the joint training, which can make the first prediction layer and the second prediction layer share some of the parameters, thereby simplifying the training process.

In some embodiments, the tooling mold may further include an image acquisition device. The image acquisition device may be configured to acquire a hole quality at a position of the hole of the semi-finished brake disc. The method for brake disc manufacturing may further include: in response to the hole quality being greater than a present threshold, adding data corresponding to the semi-finished brake disc to the second training samples for training of the machining model.

The image acquisition device may include a camera, a camcorder, or the like.

The hole quality may include a uniformity of a position distribution of the heat dissipation holes, a roughness of the heat dissipation holes, etc.

For example, the semi-finished brake disc C may be continuously rotated, and the image acquisition device may continuously take an image of the positions of the heat dissipation holes on a cylindrical surface to confirm the quality of the heat dissipation holes by an image recognition technique.

In some embodiments, in response to the hole quality being greater than the present threshold, the control system may add the data corresponding to the semi-finished brake disc to the second training samples for training of the machining model. The present threshold may be preset based on manual experience.

In some embodiments of the present disclosure, by adding the latest data with better actual hole quality to a sample library to update the data in the second training samples, the output effect of the machining model can be enhanced.

In 740, finishing equipment may be controlled to machine the brake disc blank after deposition based on the second machining parameter to obtain a semi-finished brake disc.

The finishing equipment refers to a machine or a tool used for more precise and detailed machining of the brake disc blank after preliminary machining. For example, the finishing equipment includes a CNC machine tool, a grinding machine, a polishing machine, etc.

In some embodiments, the finishing equipment may machine the brake disc blank based on the second machining parameter by performing, for example, grinding, polishing, or the like, thereby obtaining the semi-finished brake disc.

In some embodiments of the present disclosure, optimizing the parameters of the hole machining process improves the machining accuracy, reduces internal defects, optimizes material performance, enhances production efficiency, and reduces costs. Meanwhile, the machining model based on historical data provides scientific decision support, achieving a flexible response to design changes and ensuring the quality and reliability of the finished product.

The above S5 deposition and S6 siliconization process are performed using the following five sets of experiments, wherein consistent conditions are that a deposition gas source is a propane gas, a deposition pressure is controlled to be 4 kPa, a particle size of silicon powder is controlled to be 1 mm, a siliconization temperature is controlled to be 1600° C., and a siliconizing time is controlled to be 2 h.

(1) A maximum temperature of the vapor deposition is controlled at 950° C., and a total time of the vapor deposition is controlled at 200 h. After weighing and density measurement, the semi-finished brake disc with a density of 1.13 g/cm$^3$ is obtained. After the vapor deposition, the siliconization process is performed to improve the structural strength, and the brake disc with a density of 1.8 g/cm$^3$ is obtained after siliconization.

In S7, it requires a force of 10N to pull out the plugging segments 1 from the heat dissipation holes 3, and the plugging segments 1 can be easily pulled out from the heat dissipation holes 3. The heat dissipation holes of the semi-finished brake disc are complete without collapse of edges, the semi-finished brake disc has no cracking and no silicone streaks on the surface, the inner surface of the heat dissipation holes has good finish because of mold plugging, and no silicon enrichment occurs. The inner surface of the heat dissipation holes only needs to be appropriately treated without sandblasting and polishing.

(2) The maximum temperature of the vapor deposition is controlled at 1000° C., and the total time of the vapor deposition is controlled at 300 h. After weighing and density measurement, the semi-finished brake disc with a density of 1.38 g/cm$^3$ is obtained. After the vapor deposition, the siliconization process is performed to improve the structural strength, and the semi-finished brake disc with a density of 2.18 g/cm$^3$ is obtained after siliconization.

In S7, it requires a force of 9N to pull out the plugging segments 1 from the heat dissipation hole 3, and the plugging segments 1 can be easily pulled out from the heat dissipation holes 3. The heat dissipation holes of the semi-finished brake disc are complete without collapse of edges, the semi-finished brake disc has no cracking and no silicone streaks on the surface, the inner surface of the heat dissipation holes has good finish because of mold plugging, and no silicon enrichment occurs. The inner surface of the heat dissipation holes only needs to be appropriately treated without sandblasting and polishing.

(3) The maximum temperature of the vapor deposition is controlled at 1000° C., and the total time of the vapor deposition is controlled at 500 h. After weighing and density measurement, the semi-finished brake disc with a density of 1.52 g/cm$^3$ is obtained. After the vapor deposition, the siliconization process is performed to improve the structural strength, and the semi-finished brake disc with a density of 2.42 g/cm$^3$ is obtained after siliconization.

In S7, it requires a force of 10N to pull out the plugging segments 1 from the heat dissipation hole 3, and the plugging segments 1 can be easily pulled out from the heat dissipation holes 3. The heat dissipation holes of the semi-finished brake disc are complete without collapse of edges, the semi-finished brake disc has no cracking and no silicone streaks on the surface, the inner surface of the heat dissipation holes has good finish because of mold plugging, and no silicon enrichment occurs. The inner surface of the heat dissipation holes only needs to be appropriately treated without sandblasting and polishing.

(4) The maximum temperature of the vapor deposition is controlled at 1050° C., and the total time of the vapor deposition is controlled at 600 h. After weighing and density measurement, the semi-finished brake disc with a density of 1.64 g/cm$^3$ is obtained. After the vapor deposition, the siliconization process is performed to improve the structural strength, and the semi-finished brake disc with a density of 2.33 g/cm³ is obtained after siliconization.

In S7, it requires a force of 6N to pull out the plugging segments 1 from the heat dissipation hole 3, and the plugging segments 1 can be easily pulled out from the heat dissipation holes 3. The heat dissipation holes of the semi-finished brake disc are complete without collapse of edges, the semi-finished brake disc has no cracking and no silicone streaks on the surface, the inner surface of the heat dissipation holes has good finish because of mold plugging, and no silicon enrichment occurs. The inner surface of the heat dissipation holes only needs to be appropriately treated without sandblasting and polishing.

| Serial number | Deposition temperature (° C.) | Deposition time (h) | Deposition pressure (kPa) | Gas flow rate (L/min) | Deposition density (g/cm³) | Siliconization temperature (° C.) | Siliconization time (h) | Siliconization density (g/cm³) | Tensile load (N) |
|---|---|---|---|---|---|---|---|---|---|
| 1 | 950 | 200 | 4 | 160 | 1.13 | 1600 | 2 | 1.8 | 10 |
| 2 | 1000 | 300 | 4 | 180 | 1.38 | 1600 | 2 | 2.18 | 9 |
| 3 | 1000 | 500 | 4 | 185 | 1.52 | 1600 | 2 | 2.42 | 10 |
| 4 | 1050 | 600 | 4 | 190 | 1.64 | 1600 | 2 | 2.33 | 6 |
| 5 | 1050 | 800 | 4 | 210 | 1.73 | 1600 | 2 | 1.92 | 3 | ging segments 1 can be easily pulled out from the heat dissipation holes 3. The heat dissipation holes of the semi-finished brake disc are complete without collapse of edges, the semi-finished brake disc has no cracking and no silicone streaks on the surface, the inner surface of the heat dissipation holes has good finish because of mold plugging, and no silicon enrichment occurs. The inner surface of the heat dissipation holes only needs to be appropriately treated without sandblasting and polishing.

(5) The maximum temperature of the vapor deposition is controlled at 1050° C., and the total time of the vapor deposition is controlled at 800 h. After weighing and density measurement, the semi-finished brake disc with a density of 1.73 g/cm³ is obtained. After the vapor deposition, the siliconization process is performed to improve the structural strength, and the semi-finished brake disc with a density of 1.92 g/cm³ is obtained after siliconization.

In S7, it requires a force of 3N to pull out the plugging segments 1 from the heat dissipation hole 3, and the plugging segments 1 can be easily pulled out from the heat dissipation holes 3. The heat dissipation holes of the semi-finished brake disc are complete without collapse of edges, the semi-finished brake disc has no cracking and no silicone streaks on the surface, the inner surface of the heat dissipation holes has good finish because of mold plugging, and no silicon enrichment occurs. The inner surface of the heat dissipation holes only needs to be appropriately treated without sandblasting and polishing.

After the above five sets of experiments, it can be seen from the list comparison of experimental data that as for the brake disc preform with an inner diameter of 200 mm, an outer diameter of 350 mm, and a thickness of 30 mm, the parameters have the effect on the deposition density, the siliconization density, and the use of the mold when the propane is used as a vapor deposition gas, and the effect of the mold and the production process on the heat dissipation holes and the surfaces of the semi-finished brake disc. From the above experimental results, it can be seen that the parameters have the effect on the density of the semi-finished brake disc, and it is not the case that the semi-finished brake disc with a higher density after the vapor deposition obtains a higher siliconization density after the siliconization process leads. In addition, it can be seen that the tooling mold sprayed with the release additive boron nitride can be easily pulled out of the semi-finished brake disc, which makes it easy to operate. Since the use of the tooling mold and the method for brake disc manufacturing, the holes of the semi-finished brake disc are complete without collapse of edges, the semi-finished brake disc has no cracking and no silicone streaks on the surface, the inner In summary, the method for brake disc manufacturing in the present disclosure first cures the disc body preform by resin, and then performs machining after the disc body preform reaches a certain density, which reduces the difficulty of hole machining and finishing, and reduces the time and consumption of raw materials of the subsequent vapor deposition, thereby reducing production costs.

The tooling mold in the present disclosure can achieve the adjustment of the spacings of the plugging segments loaded on the slider plates through the slider plates, so that different sets of plugging segments are formed based on the slider plates, the overall adjustment is flexible, and the combined spacing adjustment of the brake discs of different sizes can also be realized. The grouping of the slider plates and the plugging segments reduces storage and placement space, improves efficiency of mold insertion, and facilitates operation for the operator. The plugging segments are made of the ceramic material or the composite material, and the plugging segments perform the interference fit with the heat dissipation holes, which can reduce the rate of material penetration at a high temperature during the siliconization process, and facilitate the uniformity of product materials, thereby ensuring the uniformity of the expansion coefficient and reducing product cracking. Meanwhile, the cooperation of the slider plates and the plugging segments achieves positioning of the heat dissipation holes, which reduces the problem of uneven stress release of the machined surface during high temperature treatment, ensures the integrity of the heat dissipation holes, and reduces the collapse of edges, holes, and cracks.

The use of the tooling mold and the method for brake disc manufacturing using the tooling mold for brake disc manufacturing improve the inner surface finish of the heat dissipation holes, reduce the amount of post machining, avoid silicone streaks on the surface of the finished product, and reduce the dynamic imbalance of the brake disc and the non-uniformity of the airflow rate.

The preferred embodiments of the present disclosure disclosed above are only intended to assist in elaborating the present disclosure. The preferred embodiments are not an exhaustive recitation of all the details and do not limit the present disclosure to the specific embodiments described herein only. Obviously, many modifications and variations can be made in accordance with the present disclosure. The embodiments are selected and specifically described in the present disclosure for the purpose of better explaining the principles and practical applications of the present disclosure to enable those skilled in the art to which it belongs to well understand and utilize the present disclosure. The present disclosure is limited only by the claims and entire scope and equivalents thereof.

What is claimed is:

1. A tooling mold for brake disc manufacturing, used for mold plugging of heat dissipation holes on an outer peripheral side of a semi-finished brake disc of a carbon-carbon composite material after preliminary machining, wherein the tooling mold comprises:
  plugging segments, wherein a shape of each of the plugging segments is consistent with a shape of each of the heat dissipation holes provided on the outer peripheral side of the semi-finished brake disc, and interference fit is achieved after plugging, an end portion of each of the plugging segments being fixedly connected with a chute through a connecting rod; and
  slider plates each of which adopts a curved structure with a uniform thickness, wherein each of the slider plates matches with each chute.

2. The tooling mold of claim 1, wherein the chute adopts a curved structure corresponding to the curved structure of each of the slider plates, and the chute includes a retention flange which slidably matches with each of the slider plates.

3. The tooling mold of claim 1, wherein the plugging segments are made of a ceramic material or a composite material; and the composite material includes the carbon-carbon composite material, and a carbon-ceramic composite material.

4. A method for brake disc manufacturing using a tooling mold for brake disc manufacturing, applying the tooling mold as described in claim 1, wherein the method for brake disc manufacturing comprises:
  S1, fabricating a disc body preform of a carbon-carbon composite material;
  S2, performing resin impregnation or spraying treatment on the disc body preform;
  S3, curing and drying the disc body preform to obtain the disc body preform with a curing density of 0.4 g/cm$^3$-1.2 g/cm$^3$, wherein a temperature of room temperature curing is in a range of 20° C.-80° C., and a curing duration is in a range of 24 h-48 h; a maximum temperature of high temperature curing is in a range of 200° C.-300° C., and a holding duration of the maximum temperature is in a range of 2 h-6 h;
  S4, performing surface grooving and hole machining on the disc body preform obtained after curing and drying based on a shape of the brake disc to obtain a brake disc blank, wherein a peripheral side of the brake disc blank is surrounded by the heat dissipation holes, and a hole diameter of each of the heat dissipation holes is less than a hole diameter of each of holes of a finished brake disc;
  S5, introducing a mixed gas of methane and propane or other hydrocarbon gases into the brake disc blank formed after surface grooving and hole machining, wherein a gas flow rate is controlled to be in a range of 50-300 L/min, and a deposition pressure is controlled to be in a range of 50 Pa-10 kPa, performing a repeated vapor deposition process for 200 h-2000 h at a temperature of 950° C.-1800° C. to obtain the brake disc blank with a density of 1.25 g/cm$^3$-1.75 g/cm$^3$, and then performing a finishing process on the brake disc blank to form the semi-finished brake disc after the vapor deposition process and the finishing process;
  S6, performing a siliconization process on the semi-finished brake disc using the tooling mold, including:
  arranging around at least two sets of slider plates based on a count of the heat dissipation holes disposed on the peripheral side of the semi-finished brake disc and a diameter of the semi-finished brake disc, and providing plugging segments corresponding to positions and the count of the heat dissipation holes on the slider plates to form a complete circular adjustment structure;
  after lateral adjustment of the plugging segments on the slider plates, extruding and inserting the plugging segments into the heat dissipation holes at the corresponding positions, and spraying a high temperature mold release additive on surfaces of the plugging segments and the slider plates before the inserting to facilitate subsequent mold release;
  after the inserting, putting the semi-finished brake disc into a graphite boat covered with silicon powder, a particle size of the silicon powder being controlled to be in a range of 5 μm-1.5 mm, performing the siliconization process at a temperature of 1400° C.-1800° C., and controlling a siliconizing time to be in a range of 30 min-6 h after a specified siliconization temperature is reached, so that silicon penetrates into the semi-finished brake disc until the density of the semi-finished brake disc rises to 2 g/cm$^3$-2.8 g/cm$^3$ after weighing and density measurement, so as to obtain the semi-finished brake disc after the siliconization process;
  S7, after the siliconization process is completed, pulling out T-shaped structures formed by chutes on connecting rods of the plugging segments from the heat dissipation holes by stretching, and disengaging the plugging segments from the slider plates in sequence to complete use of the tooling mold; and finally obtaining the finished brake disc after weighing, density measurement, refinement machining, and a dynamic balancing test of the semi-finished brake disc.

5. The method of claim 4, wherein the silicon powder is doped with other high temperature resistant powders, and the other high temperature resistant powders include boron nitride, silicon carbide, tungsten carbide, zirconium oxide, alumina, aluminum nitride, titanium diboride, and hafnium carbide.

* * * * *